Feb. 21, 1939.  A. M. ALEXANDRESCU  2,147,956
LUBRICATING PISTON SKIRT CONSTRUCTION
Filed April 24, 1937    2 Sheets-Sheet 1
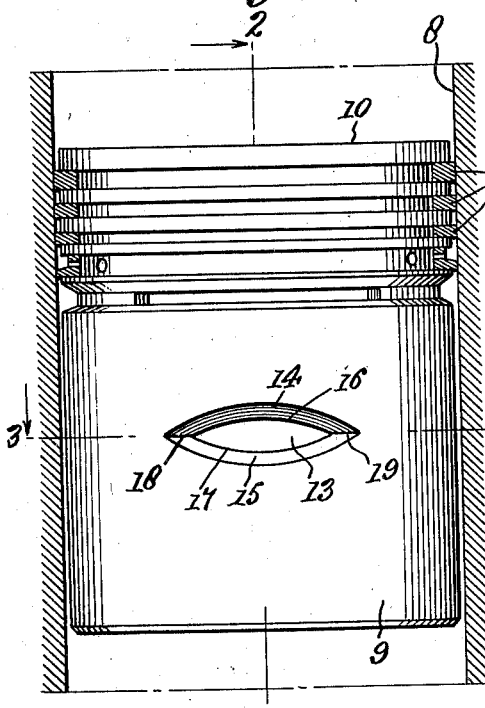
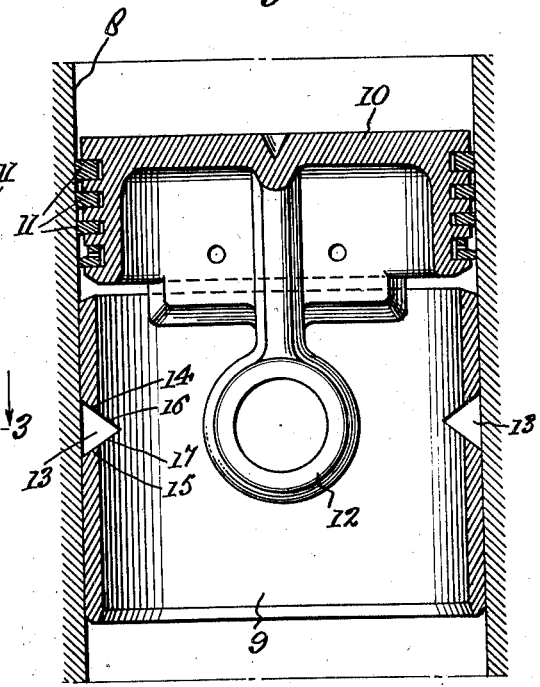
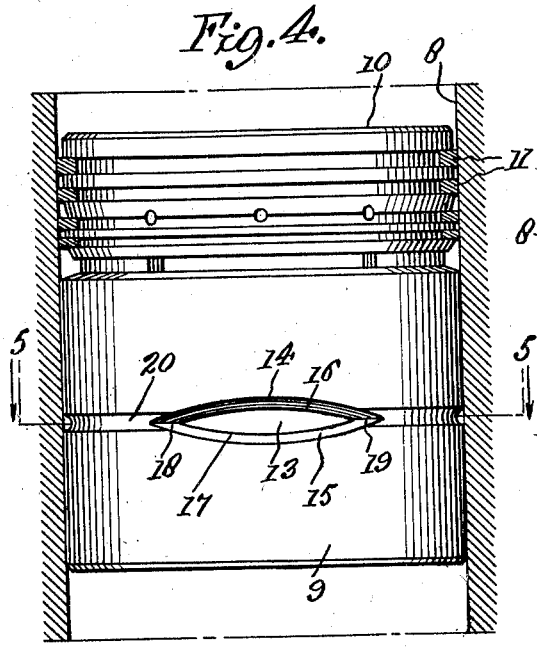
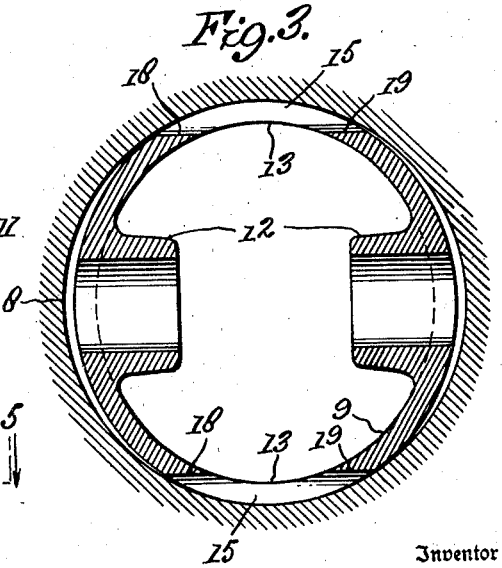
Inventor
A. M. Alexandrescu
By Wilkinson & Mawhinney
Attorneys.

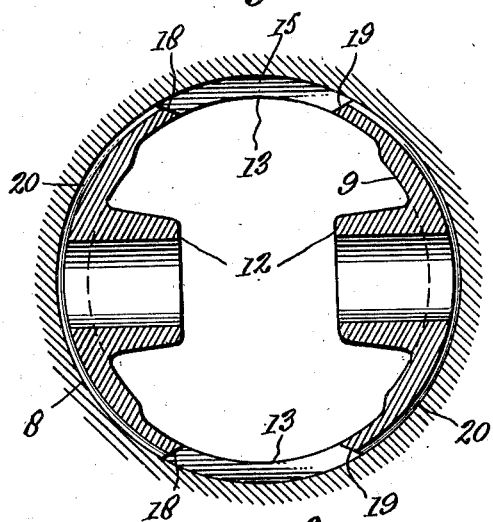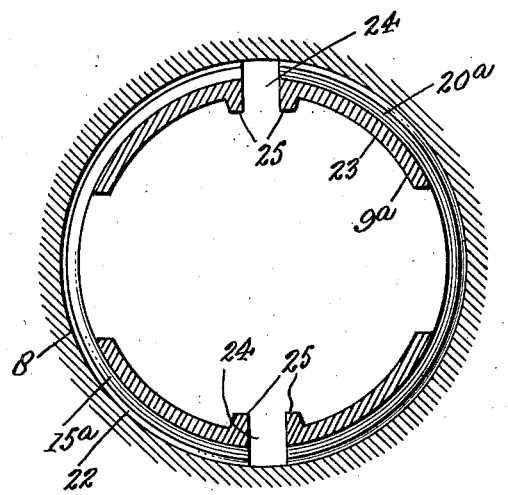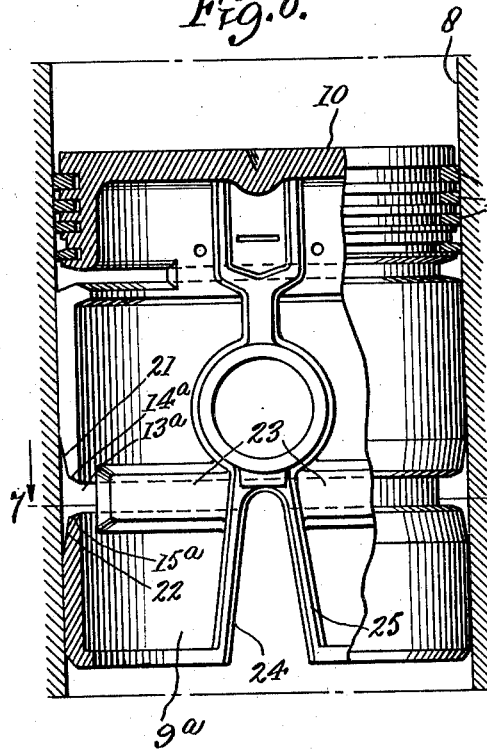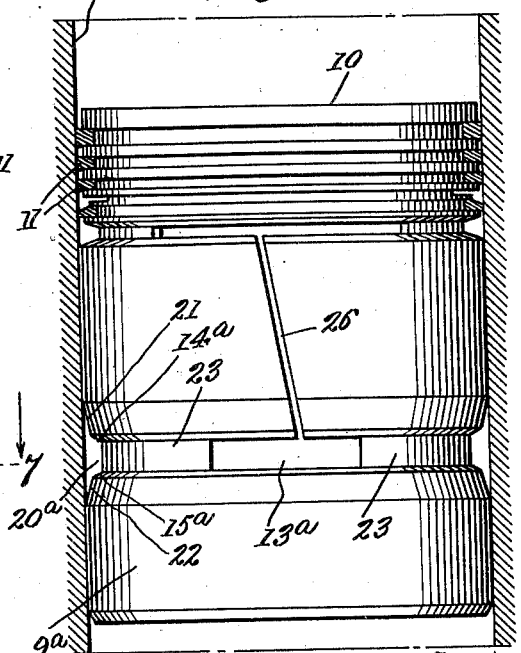

Patented Feb. 21, 1939

2,147,956

UNITED STATES PATENT OFFICE 2,147,956

LUBRICATING PISTON SKIRT CONSTRUCTION

Alexander M. Alexandrescu, Cleveland, Ohio

Application April 24, 1937, Serial No. 138,822

8 Claims. (Cl. 309—8)

The present invention relates to improvements in lubricating piston skirt constructions and is a continuation in part of my prior applications, Serial No. 35,001, filed August 6, 1935, for Piston for internal combustion engines and Serial No. 77,036, filed April 29, 1936, for Piston and ring construction.

An object of the present invention is to provide for the lubrication of the external walls of the skirt portions of the pistons of internal combustion engines, particularly over that area of the skirt which is at substantially right angles to the axis of the wrist pin. This area in practice receives the greatest wear because of the action of the cranks, connecting rods and wrist pin. The wear in these areas of the skirt which are diametrically opposed to one another result in the formation of small metal crumbs due to the heat of friction, these metal crumbs coming off both the piston and the cylinder wall; as a result of which scoring of the piston and cylinder wall takes place with burning of the piston areas referred to and, resulting in leakage of oil. The crumbs adhere to the cylinder wall and when the rings of the piston descend such crumbs get between such rings and in the grooves beneath and they cause jamming of the rings and freezing of the rings in the grooves. The outside surfaces of the rings are also cut and scored by the presence of these metal crumbs on the cylinder walls.

It is the object of the invention primarily to provide means for supplying an adequate amount of lubricant to these starved areas of the piston skirt and to maintain an adequate supply of lubricant at and over these surfaces at all times irrespective of the speed of movement of the piston in the cylinder.

The invention also has for another object to provide a lubricant construction which will positively feed lubricant at all times to such areas of the skirt and in some instances to provide for a free circulation of the lubricant on and about the entire circumference of the skirt.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a fragmentary vertical section taken through a cylinder and piston and showing the improved lubricating piston skirt construction.

Figure 2 is a central vertical sectional view taken along the line 2—2 in Figure 1.

Figure 3 is a horizontal section taken on the line 3—3 in Figure 1.

Figure 4 is a view similar to Figure 1 showing a slight modification.

Figure 5 is a horizontal section taken on the line 5—5 in Figure 4.

Figure 6 is a fragmentary vertical section of a cylinder with a piston shown therein partly in elevation and partly in section and showing a further modified form of the invention.

Figure 7 is a horizontal section taken on the line 7—7 in Figure 6, and

Figure 8 is a fragmentary front elevation of the piston showing the lubricating opening.

Referring more particularly to the drawings and for the present to Figures 1, 2 and 3, 8 represents generally a portion of the cylinder of an internal combustion engine and 9 the skirt portion of a piston mounted in the usual way to reciprocate in such cylinder. The piston head is indicated generally at 10 and the piston rings at 11. In Figures 2 and 3 the usual bosses 12 are shown which receive the wrist pin in a manner commonly known in this art.

In accordance with the invention the skirt portion 9 of the piston is formed with openings 13. These openings, as appears in Figure 3, are two in number. They lie at substantially diametrically opposite portions of the skirt. They are both arranged in areas of the skirt 9 which are at right angles, or approximately right angles, to the axis of the bosses 12 or the axis of the wrist pin which occupies such bosses.

The openings 13 pass entirely through the walls of the skirt 9 as best seen in Figure 3 so that such openings lie upon both inner and outer surfaces of the skirt wall and they permit free passage of the oil or lubricant from the interior of the piston into which such oil is splashed by the action of the cranks from the crankcase, through the skirt wall and to the outside surfaces of such skirt wall where this oil or lubricant spreads over the entire surface of the skirt portion and lubricates such skirt portion in its travel up and down on the cylinder wall.

By an examination of Figure 2, it will be seen that the upper and lower walls 14 and 15 of the openings 13 are inclined in such a way that they converge inwardly. The inner edges 16 and 17 of these walls present relatively sharp lines or blades for encountering the oil body adhering to the inner walls of the piston. The walls 14 and 15 of the openings 13 diverge outwardly toward the outer surface of the piston skirt and thus form wide mouths for the dissemination of the lubricant upon the cylinder walls, and at the same time these inclined walls induce a flow of such oil outwardly, particularly cooperating with the up and down rapid reciprocating movement of the piston which tends to require the oil to slide along such inclined walls 14 and 15 and thus to be positively driven outwardly upon the cylinder wall where the wide mouths of the openings 13 will accommodate relatively large quantities of the oil and spread the same over relatively great surfaces.

By viewing Figure 1 it will be seen that the preferred configuration of the openings 13 is oval or elliptical. The elliptical form presents the largest port area at the center which is preferably coincident with the center line of the piston at right angles to the axis of the wrist pin. The largest amount of oil passes through the central port area so that the oil delivered is centered with respect to the starved areas of the piston skirt. The elliptical form also induces delivery at the side edges thereof at substantially right angles to the delivery induced by the inclined walls 14 and 15 which is up and down with respect to the path of movement of the piston. Also the elliptical form of the walls 14 and 15 causes the lubricant to diverge in substantially all radial directions from the axis of the ellipse. The end walls 18 and 19 of the elliptical openings 13 are preferably cut off substantially in alinement along a chord of the arc of the circle over which the outer wider mouths of the openings extend.

From Figure 1 it will be observed that the openings 13 are located in a substantially central position with respect to the height of the skirt. The centers of the openings 13 are shown in Figures 1 and 2 to be at the same elevation as the axis of the wrist pin.

In Figures 1, 2 and 3 the invention is shown as applied to an oval piston. This form of piston is particularly illustrated in Figure 3 where gaps exist between the skirt and cylinder wall at the bosses 12 or ends of the wrist pin. The lubricating openings 13 are shown at the portions of the skirt which are in direct frictional contact with the cylinder wall as these portions receive the greatest wear.

Referring more particularly to Figures 4 and 5, the openings 13 are the same as previously discussed in connection with Figures 1, 2 and 3 except that the end portions of the openings 13 merge into an annular channel or groove 20 which extends all around the piston as shown in Figure 5. Figure 5 also shows that the invention is applied to a round, as distinguished from an oval piston. In the skirt of the round piston which contacts the cylinder wall all around, it is necessary to have lubrication throughout the entire circumference of the piston. This is taken care of by the annular channel or groove 20 which acquires quantities of the lubricant from the end portions of the elliptical openings 13 and conveys such lubricant to all circumferential points of the piston. The up and down reciprocating movement of the piston induces a flow of the oil out of the annular channel or groove 20 and against the contacting friction surfaces of the piston and cylinder.

Referring more particularly to Figures 6 and 7, the skirt portion 9ª of the piston is formed with the openings 13ª which are similar to the openings 13 heretofore described and are likewise positioned at diametrically opposite points, which points are at substantially right angles to the axis of the wrist pin.

This form of the invention differs from the previous form in that adjacent the upper and lower walls 14ª and 15ª the outer surface portions of the piston skirt are beveled or inclined along areas designated at 21 and 22. The openings 13ª in this case need not be made elliptical but are, for instance, rectangular as shown in Figure 8.

The skirt is in two sections coupled together by the connector members 23. The slot or annular channel 20ª is conveniently formed between the two divided sections of the skirt and the connector forms the inner wall of such annular connector or groove which in this case is made deep in a radial sense.

In forming a piston such as shown in Figures 6, 7 and 8, the entire piston is originally cast, and is then removed to a lathe where all of the ring grooves are cut simultaneously with the grooves between the skirt portions of the piston. This includes the annular channel or groove 20ª. During the previous casting operation the connectors 23 are cast within the skirt. These connectors preferably join with the bosses but they are spaced apart at the points where the openings 13ª are to occur. Consequently, the lathe cutting tool may cut through the entire wall of the skirt between the spaced ends of the connectors thus forming the openings 13ª. This is done all in one operation at the same time as forming the annular channel or groove 20ª. In other words, the lathe cuts circumferentially all around the channel 20ª a depth substantially the same as the thickness of the wall of the piston skirt but the connectors 23 hold the two portions of the skirt together with the openings 13ª presented therein.

The piston is also formed within the inverted V-shaped cut-away portions 24 opening downwardly through the lower edge of the skirt and having their upper apex portions disposed at or adjacent the bosses. These cut-away portions are formed with internal flanges 25 which flanges preferably merge with the bosses and with the connectors whereby to form a reinforced and strong piston body construction to maintain the piston in its original round formation. The cut-away portions 24 also allow contraction and expansion. The oil circulated to the annular channel 20ª by the openings 13ª will find its way along such channel to the apexes of the cut-away portions 24 which apex portions extend into the annular channel 20ª. The apex portions extend all the way through the piston whereby the lubricant may escape into the interior of the piston and thence drop down into the crankcase.

In Figure 8 a slot 26 is shown in the upper portion of the piston skirt. This slot extends diagonally and has its ends disposed in openings of the piston. One or more slots may be used and this allows for expansion and contraction. This slot 26 is at substantially right angles to the cut-away portions 24.

In the operation of the device, oil is splashed from the crankcase up within the piston and clings to the interior piston wall. Due to the rapid movement of the piston up and down in the cylinder the gobs or batches of oil adhering to the interior wall are caused to move up and down such wall; or rather the oil masses tend to remain stationary by inertia while the piston rapidly moves up and down with respect thereto. In so moving the openings 13 and 13ª are presented to the oil masses. The sharp upper and lower edges of the openings and the inclined walls 14 and 15 encounter these oil masses and forcibly project the masses radially outward through the openings and against the cylinder walls.

In the case of Figures 6, 7 and 8, these masses of oil get into the circumferential spaces formed by the beveled or inclined areas 21 and 22. These open areas communicating directly with the large open mouths of the openings are situated to rapidly receive relatively great quantities of the lubricant moving out upon the inclined walls 14 and 15. The movement of the piston causes these relatively great quantities of oil to be passed between the piston and the cylinder wall and to be spread out over substantially the entire area of the skirt, thus effectively lubricating the same. Due to the tapering form of the areas 21 and 22 a substantially wedge shaped space is provided in cross section. The wedge action, especially at high speed of the piston, moves the oil with great force into the space between the piston and the cylinder wall.

This great quantity of oil is desirable in a piston of this character which may be fitted to the cylinder with much less than the conventional clearance due to the construction of the piston involving the slot 26 and the cut-away portions 24. This slot and these cut-away portions permit of local expansion and contraction of the sections of the skirt. At the same time, no strength of construction is sacrificed because the connectors 23 and the bosses provide ample rigidity of this piston. The rigidity is of course essential in a round piston. Therefore, the present piston embodies the attributes of rigidity, flexibility in expansion and contraction, thus permitting of fitting with very small clearance, and a high degree lubrication which is essential to the proper operation of a piston of the round variety so closely fitted. The cut-away portions and the slot and the general piston construction not only permit close fitting for contraction and expansion but also provides a construction which will not "freeze". The skirt will contract through the cut-away portions rather than freeze onto the cylinder wall when the connecting rod is not properly lined up.

It is obvious that various changes and modifications may be made in the details of construction and design of the above specifically described embodiment of this invention without departing from the spirit thereof, such changes and modifications being restricted only by the scope of the following claims.

What is claimed is:

1. In a piston, a piston head and a skirt, said skirt having a substantially cylindrical wall with an outer surface to engage the cylinder and with an inner surface to receive oil splashed up from the crankcase, said skirt having an opening through its cylindrical wall, the opening lying upon both inner and outer surfaces of the skirt wall, the opening having upper and lower walls both of which are inclined in such wise that they converge inwardly of the skirt, the inner edges of the walls of said opening presenting relatively sharp edges for encountering the oil body adhering to the inner surface of the skirt, the upper and lower walls of said opening diverging outwardly toward the outer surface of the piston skirt and forming a wide mouth for the dissemination of the lubricant upon the cylinder walls, the reciprocating movement of the piston tending to require the oil body adhering to its inner surface to slide along said inclined upper and lower walls of the opening whereby the inclination given both said walls tends, on the reciprocating movement of the piston, to drive the oil body outwardly upon the cylinder wall.

2. In a piston, a head, and a skirt, said skirt having a substantially cylindrical side wall with an open bottom through which the crankcase oil is splashed onto the interior surface of said side wall, bosses on the skirt for receiving the wrist pins, said side wall having an opening at substantially right angles to said bosses, said opening lying upon both inner and outer surfaces of the skirt, said opening having upper and lower walls inclined and converging inwardly, said inclined walls on both the upward and downward movements of the piston acting to drive the oil body adhering to the inner surface of the skirt outwardly to the cylinder wall, said upper and lower opening walls having relatively sharp inner edges for encountering said oil body, said upper and lower opening walls diverging outwardly toward the outer surface of the skirt and forming a wide mouth for the dissemination of the oil body upon the cylinder wall.

3. In a piston, a piston head and a skirt, said skirt having a substantially cylindrical wall with inner and outer surfaces and an open bottom for receiving crankcase oil splashed upon said inner surface, said skirt wall having an opening, said opening lying all the way through said skirt wall and being upon the inner and outer surfaces thereof, said opening being elongated in a circumferential direction of the skirt wall, said opening having upper and lower walls, the walls being curved in the direction of elongation to form a substantial oval opening having its largest port area at the central part of the opening, the lower wall being inclined from the outer surface of the skirt upwardly and inwardly, the upper wall of said opening being inclined from the outer surface of the skirt inwardly and downwardly, said inclined walls having circumferentially extending sharp inner edges on the inner surface of the skirt side wall to encounter the oil body thereon and to cause said oil body to slide inwardly and upwardly along the inclined upper wall toward the center of the elliptical opening upon the downward stroke of the piston, and to slide inwardly and downwardly along the inclined lower wall of said elliptical opening upon the upward stroke of the piston, for concentrating the lubrication along said central area of the opening.

4. In a piston, a piston head, and a skirt, said skirt having a substantially cylindrical side wall with inner and outer surfaces and with an open bottom to permit the splash of crankcase oil upon the interior surface of the skirt wall, said skirt wall having a substantially elliptical opening extending all the way therethrough and lying upon the inner and outer surfaces of said skirt, said opening being elongated in the circumferential direction of said skirt wall, said opening having upper and lower walls, said upper and lower walls being arcuate in the circumferential direction of the piston and being inclined in opposite senses with respect to one another, the lower opening wall being inclined upwardly and inwardly from the outer surface of the skirt wall, the upper opening wall being inclined inwardly and downwardly from the outer surface of the skirt wall, said upper and lower inclined walls being also substantially elliptical in plan view, to cause the oil passing therethrough upon movement of the piston to be concentrated adjacent the central port area located along the center line extending from the top to the bottom of the piston.

5. In a piston, a head, and a skirt, said skirt having a substantially cylindrical wall with inner and outer surfaces and with an open bottom to receive splashed oil from the crankcase on the inner surface of the wall, a substantially elliptical opening made through the skirt wall, a groove on the outer surface of the skirt wall extending around such skirt wall and having its ends communicating with the convergent end portions of the elliptical opening, said elliptical opening having upper and lower walls shaped to drive the oil body adhering to the inner surface of the skirt outwardly into the opening and towards the ends of the opening and so into said groove.

6. In a piston, a head, and a skirt, said skirt being hollow and having a substantially cylindrical wall with inner and outer surfaces and with an open bottom through which crankcase oil may be splashed upon the inner surface of the skirt wall, an opening in the skirt wall made completely through the wall, said opening having upper and lower walls converging inwardly of the piston, said walls having at the outer surface of the piston large beveled areas for holding great quantities of the oil splashed upon the convergent walls, and which will be driven outwardly during the up and down strokes of the piston.

7. In a piston, a head, and a skirt, said skirt having a substantially cylindrical wall with inner and outer surfaces and an open bottom to permit crankcase oil to be splashed upon the inner surface, said piston having a cut away portion in its lower part opening through the bottom of the skirt, said skirt having a substantially annular groove extending thereabout and communicating with the upper part of the cut away portion, said skirt wall having an opening therethrough in alignment and communicating with said groove, said opening having upper and lower walls inclined to drive the oil body on the inner surface of the skirt outwardly into the groove on both up and down strokes of the piston.

8. In a piston, a head, a skirt composed of upper and lower sections both being hollow and having a substantially cylindrical wall with inner and outer surfaces and an open bottom to permit crankcase oil to be splashed onto said inner surface, said skirt having an annular groove separating said upper and lower sections, said skirt wall having an opening therethrough with inclined upper and lower walls, the upper section having a slot in substantial alignment with said opening, said lower section having a cut away portion at substantially right angles to said opening and slot, said cut away portion communicating with said annular groove, said opening communicating with said groove, said groove having inclined areas communicating with the groove for holding large quantities of oil in contact with the cylinder wall.

ALEXANDER M. ALEXANDRESCU.